United States Patent Office 3,069,330
Patented Dec. 18, 1962

3,069,330
METHOD OF DETERMINING GLUTAMIC-OXAL-
ACETIC TRANSAMINASE AND COMPOSITION
THEREFOR
Arthur L. Babson, Morris Plains, N.J., assignor to War-
ner-Lambert Pharmaceutical Company, Morris Plains,
N.J., a corporation of Delaware
No Drawing. Filed Aug. 30, 1960, Ser. No. 52,793
20 Claims. (Cl. 195—103.5)

The present invention relates to a new and novel method of determining the amount in body fluids of the enzyme glutamic-oxalacetic transaminase and to a composition for use in said determination.

This enzyme is so named because of its ability to catalyze the rate of the reversible reaction of L-glutamic acid with oxalacetic acid to form α-ketoglutaric acid and L-aspartic acid in which, as noted, an amino group is shifted from one molecule to another:

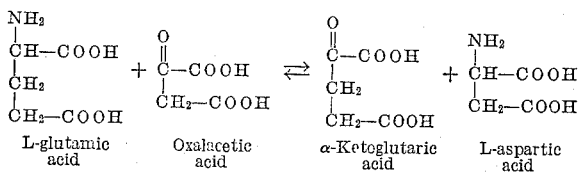

| L-glutamic acid | Oxalacetic acid | α-Ketoglutaric acid | L-aspartic acid |

The rate of this reaction is directly proportional to the concentration of the above enzyme in the reaction medium. It is known that this transaminase enzyme is released within the body in certain types of cell destruction and for this reason the measurement of the enzyme concentration is a valuable aid in the diagnosis of diseases where such cell destruction takes place as, for example, myocardial infarction, intrahepatic lymphoma or carcinoma, hepatitis, cirrhosis and the like. This enzyme is released into body fluids, such as the blood, spinal fluid and the like. It is most commonly measured in blood serum which is the liquid fraction obtained by centrifuging clotted whole blood.

All the methods currently known for determining the concentration of this transaminase enzyme in body fluids, for example blood serum, depend on the measurement of the rate of the above chemical reaction, by measuring the rate of formation or disappearance of one of the compounds taking part in the reaction. One presently used method is based upon the fact that oxalacetic acid (formed by the reaction of α-ketoglutaric acid and L-aspartic acid in the presence of glutamic-oxalacetic transaminase) reacts with the reduced form of the coenzyme diphosphopyridine nucleotide (DPNH) in the presence of malic dehydrogenase to form diphosphopyridine nucleotide (DPN) and malic acid. Since DPNH has a characteristic ultraviolet absorption band at 340 mμ, the measurement of the rate at which the optical density changes is directly proportional to the rate at which oxalacetic acid is formed and thus proportional to the concentration of glutamic-oxalacetic transaminase in the serum being tested. Although this method is accurate and reliable, it requires the use of an ultraviolet spectrophotometer to measure the optical density at 340 mμ. Since many small laboratories do not have such an instrument, this method does not have the widespread applicability desirable in a diagnostic aid.

Another method in use depends on the reaction of oxalacetic acid (formed in the above-described transaminase catalyzed reaction) with 2,4-dinitrophenylhydrazine to form a dinitrophenylhydrazone of oxalacetic acid which absorbs light in the visible spectrum. Thus, this method does not require an ultraviolet spectrophotometer. However, it suffers the disadvantage that the α-ketoglutaric acid of the substrate also forms a dinitrophenylhydrazone derivative which absorbs light at the same general region in the visible spectrum as does the dinitrophenylhydrazone of oxalacetic acid. Thus, there will be a large "blank" reading due to the optical density of the substrate and the method depends on measuring small differences between large numbers, generally an unfavorable condition for obtaining accurate results.

Attempts to overcome this problem have not been entirely successful. By limiting the amount of α-ketoglutaric acid in the substrate, the "blank" reading is reduced, but this promotes inaccuracies since there may not be sufficient substrate present. In all enzymatic reactions, particularly those involving a reversible reaction, it is essential that the substrate be present in large excess. An alternative involves extraction of the dinitrophenylhydrazone of oxalacetic acid from the substrate with a solvent such as toluene. This procedure, while sound in theory, involves many manipulative steps and is thus not practical for routine and rapid analyses by small laboratories.

There has, therefore, long been a need for a rapid and accurate method of determining the concentration of the glutamic-oxalacetic transaminase enzyme in blood serum or other body fluids which can be carried out on a routine basis in small laboratories by relatively unskilled technicians without the need for special equipment.

It is, therefore, an important object of the present invention to provide a rapid and accurate method of determining the concentration in a small volume of a body fluid of glutamic-oxalacetic transaminase.

It is a further object of this invention to provide a method of determining the concentration of glutamic-oxalacetic transaminase in blood serum which can be carried out on a routine basis without special equipment by even unskilled personnel.

Yet another object of this invention is to provide a substrate for use in the determination of the concentration of the enzyme glutamic-oxalacetic transaminase in body fluids.

Other objects and the advantages of the present invention will become apparent from the following detailed description.

It has now been found that the rate of the reaction of L-aspartic acid with α-ketoglutaric acid catalyzed by the enzyme glutamic-oxalacetic transaminase present in an unknown body fluid, and thus the concentration of this enzyme in the body fluid, may be determined by measuring the depth of color developed by the coupling of an azonium salt with the oxalacetic acid formed by the reaction. In accordance with one embodiment of this invention, a small volume of the body fluid to be tested is incubated with a substrate comprising L-aspartic acid and α-ketoglutaric acid and then an azonium salt is added to form a visible color with a depth proportional to the concentration of the enzyme in the body fluid. In accordance with a second and preferred embodiment of this invention, a small volume of the body fluid is incubated with a substrate comprising L-aspartic acid, α-ketoglutaric acid and an azonium salt, the formation of oxalacetic acid and color development occurring simultaneously. Since a visible color is produced, a complex ultraviolet spectrophotometer is not required and since the azonium salt couples only with oxalacetic acid, a high degree of accuracy of measurement is obtained.

The method of this invention is adapted to the determination of the enzyme glutamic-oxalacetic transaminase in any body fluid, including spinal fluid, blood serum and the like. Since this enzyme is most commonly determined in blood serum, this is the normal body fluid used in the method. The blood serum is separated from clotted whole blood by centrifugation in accordance with conventional procedures.

In accordance with the first embodiment of this invention the substrate for the above determination of glutamic-oxalacetic transaminase is a buffered mixture of L-aspartic acid and α-ketoglutaric acid which is added to a small volume of the body fluid to be tested. The novel method of this invention is adaptable to the accurate measurement of glutamic-oxalacetic transaminase in as little as 0.1 ml. of body fluid. The substrate employed need only contain α-ketoglutaric acid and L-aspartic acid as the active components and the latter may be added either as the pure L-form or as the racemic mixture, D,L-aspartic acid. The amounts present are not critical, with the exception that a substantial excess of each should be present.

The buffered substrate also includes alkaline buffering materials in order to overcome the acidity of the substrate and to maintain the pH between about 6.5 and 8.0 and preferably at pH 7 to pH 7.5, during the incubation in which the oxalacetic acid is liberated. Useful buffers include trisodium phosphate, sodium barbital, tris (hydroxymethyl)aminomethane and the like.

In a preferred form of the buffered substrate which is highly convenient for use, the ingredients of the substrate are formulated into a tablet including inert pharmaceutical diluents such as lactose, leucine, stearic acid, polyvinylpyrrolidone and the like. Tablets ranging in weight from about 20 to about 40 milligrams are preferred. When a substrate in tablet form is used, the tablet is first dissolved in a small volume of water before the addition of the body fluid.

In carrying out the determination the mixture of substrate and body fluid is incubated for a controlled time at a constant temperature within the range of about 25° C. to about 40° C. to permit the desired reaction to proceed whereby the oxalacetic acid is liberated. The temperature and time of incubation may be varied, with a period of 15 to 30 minutes at about 37° C. being preferred. With lower temperatures, longer times are required while with higher temperatures, more rapid reaction is obtained. For reproducible results, of course, uniform incubation conditions should be maintained for every determination.

At the conclusion of the incubation, the incubated mixture is preferably cooled to a temperature between about 10° C. and about 20° C. While such cooling is not essential, it is desirable inasmuch as it serves to slow substantially the enzymatic reaction in the substrate and, thus, prevents significant formation of additional oxalacetic acid during the coupling step. Cooling to a lower temperature is also desirable since the azonium salt which is added is thereby stabilized against decomposition.

To the mixture is then added the azonium salt which couples with the oxalacetic acid formed in the substrate during the incubation period. Useful azonium salts are those which form a colored coupling product with oxalacetic acid, such as 4-amino-2,5-diethoxybenzanilide diazonium chloride, diazotized 2-amino-4-chloroanisole, diazotized 5-chloro-o-toluidine, p-chloro-o-toluidine diazonium chloride, diazotized 4-benzoylamino-2,5-dimethoxyaniline, 6 - benzamido - 4 - methoxy-m-toluidine diazonium chloride, 4-benzamido-2,5-diethoxyaniline diazonium chloride, tetrazotized o-dianisidine and the like. It has been found that 4-amino-2,5-diethoxybenzanilide diazonium chloride and 6-benzamido-4-methoxy-m-toluidine diazonium chloride are particularly effective salts for use in the invention since they form distinct blue and red colored coupling products, respectively, with oxalacetic acid. The quantity of the azonium salt added is not critical, except that here too a substantial excess should be added.

The azonium salt sohuld be mixed with a suitable alkaline buffer, similar to the buffers used in the substrate, to insure an optimum pH for the coupling reaction. With the preferred 4-amino-2,5-diethoxybenzanilide diazonium chloride, a pH of about 9 is particularly effective. With 6-benzamido-4-methoxy-m-toluidine diazonium chloride, a pH of about 7.4 is particularly effective. It has been found that sodium barbital is preferred, although other alkaline buffers such as trisodium phosphate, tris (hydroxymethyl)-aminomethane and the like may also be used.

The azonium salt and alkaline buffer may be formulated into a tablet in the presence of conventional inert pharmaceutical diluents, such as those used in formulating the substrate tablet. Tablets of 20 to 40 milligrams in weight are generally preferred. This physical form of the azonium salt and bufffer is a form highly convenient for use.

After the addition of the azonium salt, the mixture is allowed to stand for a few minutes to permit the coupling reaction to proceed and then is either compared with a standardized color chart or placed in a cuvette for the measurement of optical density by means of a standard spectrophotometer. The concentration of glutamic-oxalacetic transaminase in the unknown body fluid is determined by a comparison of the developed color, determined visually or in a spectrophotometer, with standards obtained by carrying out the test procedure with fluids containing known amounts of the enzyme.

While the above described test procedure in accordance with the first embodiment of this invention represents an accurate and efficient method of determining the concentration of glutamic-oxalacetic transaminase in body fluids, it has been found in accordance with a second and preferred embodiment of this invention that the procedure may be still further simplified without materially effecting the accuracy of the measurement. This second embodiment of the present invention depends upon the discovery of a buffered substrate comprising a mixture of L-aspartic acid, α-ketoglutaric acid and an azonium salt which, when incubated with a body fluid, results in the simultaneous formation of oxalacetic acid and the development of a colored coupling product of the oxalacetic acid with the azonium salt.

The substrate in accordance with this second and preferred embodiment comprises α-ketoglutaric acid, L-aspartic acid (either as the pure L-form or as the racemic mixture D,L-aspartic acid), an azonium salt with the property of coupling with oxalacetic acid within the pH range where the glutamic-oxalacetic transaminase catalyzed reaction of L-aspartic acid with α-ketoglutaric acid occurs, and suitable alkaline buffering materials. The buffering materials are included in order to overcome the acidity of the substrate and to maintain the pH during the incubation between about 6.5 and 8.0 and preferably between pH 7 and pH 7.5, which is the optimum pH for for the enzymatic reaction between L-aspartic acid and α-ketoglutaric acid catalyzed by glutamic-oxalacetic transaminase. Useful buffers include trisodium phosphate, sodium barbital, tris (hydroxymethyl)aminomethane and the like.

The quantities of the active ingredients in the substrate are not critical except that a substantial excess of each should be present.

It is essential in formulating a substrate in accordance with the second embodiment that the azonium salt used be capable of coupling with oxalacetic acid within the pH range described hereinabove for the enzymatic reaction. It has been found that 6-benzamido-4-methoxy-m-toluidine diazonium chloride is a particularly effective azonium salt in preparing a substrate in accordance with the second embodiment of this invention, since it forms a red colored coupling product with oxalacetic acid at a pH of between 7 and 7.5.

In a particularly effective form of the buffered substrate which is highly convenient for use, the ingredients are formulated into a tablet including inert pharmaceutical diluents such as lactose, stearic acid, polyvinylpyrrolidone and the like. Tablets ranging in weight from about 20 to about 40 milligrams are preferred.

In carrying out the determination, a small volume of the body fluid to be tested, for example, blood serum, is mixed with the substrate and incubated for a controlled time at a constant temperature within the range of about 25° C. and about 40° C. An incubation period of about 15 to 30 minutes at about 37° C. is generally preferred. During the incubation, oxalacetic acid is liberated at a rate and in an amount proportional to the concentration of glutamic-oxalacetic transaminase in the body fluid. Simultaneously, the liberated oxalacetic acid couples with the azonium salt present in the substrate to form a colored coupling product. At the conclusion of the incubation, the color developed in the incubated mixture is either compared with a standardized color chart or is measured in a spectrophotometer.

By use of the substrate in accordance with the second embodiment of this invention, accurate results are obtained with a remarkably simple test procedure. Heretofore, all available methods for determining the concentration of glutamic-oxalacetic transaminase in body fluids have required the use of at least two reagent systems which must be added separately during the test procedure. The new and improved substrate described above permits the determination of the concentration of this enzyme by the addition of a single reagent system to the body fluid. The substrate, therefore, represents a marked improvement over substrates heretofore known for this determination.

The following examples are included in order further to illustrate this invention:

*Example I*

Substrate tablets, each weighing 25 mg., are prepared, each tablet having the following composition:

| | Weight (mg.) |
|---|---|
| Trisodium phosphate | 2.9 |
| D,L-aspartic acid | 2.7 |
| α-Ketoglutaric acid | 0.4 |
| Polyvinylpyrrolidone | 0.5 |
| Lactose | 17.1 |
| L-leucine | 1.4 |
| | 25.0 |

Color developer tablets, each weighing 28 mg., are prepared, each tablet having the following composition:

| | Weight (mg.) |
|---|---|
| Sodium barbital | 21.5 |
| 4-amino-2,5-diethoxy-benzanilide diazonium chloride | 4.0 |
| Polyvinylpyrrolidone | 0.5 |
| L-leucine | 2.0 |
| | 28.0 |

One substrate tablet is dissolved in 0.5 ml. water. 0.1 ml. blood serum is added and the mixture is incubated at 37° C. for 20 minutes. The incubated mixture is cooled to 15° C. and one color developer tablet is added. After 5 minutes, the mixture is diluted to an appropriate volume, placed in a cuvette, allowed to stand for 5 minutes (to permit any precipitate to settle) and the optical density is read at 630 m$\mu$.

Color developer tablets, containing other diazonium salts in place of 4-amino-2,5-diethoxybenzanilide diazonium chloride, such as, for example, diazotized 2-amino-4-chloroanisole, diazotized 5-chloro-o-toluidine, p-chloro-o-toluidine diazonium chloride, 6 - benzamido - 4 - methoxy-m-toluidine diazonium chloride, 4-benzamido-2,5-diethoxyaniline diazonium chloride, tetrazotized o-dianisidine and diazotized 4-benzoylamino-2,5-dimethoxyaniline may be formulated and the test procedure described in Example I carried out in a like manner.

*Example II*

Substrate tablets, each weighing 25 mg., are prepared, each tablet having the following composition:

| | Weight (mg.) |
|---|---|
| Trisodium phosphate | 2.9 |
| D,L-aspartic acid | 2.7 |
| α-Ketoglutaric acid | 0.4 |
| 6-benzamido-4-methoxy-m-toluidine diazonium chloride | 2.0 |
| Polyvinylpyrrolidone | 0.5 |
| Lactose | 15.1 |
| L-leucine | 1.4 |
| | 25.0 |

One substrate tablet is dissolved in 0.5 ml. water, 0.2 ml. blood serum is added and the mixture is incubated at 37° C. for 20 minutes. The incubated mixture is diluted to 10 ml., placed in a cuvette and the optical density is read at 530 m$\mu$.

The method of this invention provides a rapid, accurate and simple procedure for measuring the concentration of glutamic-oxalacetic transaminase in blood serum or other body fluids. The method provides accuracy and simplicity not attainable by methods heretofore known. The azonium salt forms a colored coupling product only with oxalacetic acid and not with any other ingredient present in the incubated test mixture. The coupling product has a visible color so that usage of a complex ultraviolet spectrophotometer is not required. The substrate composition in accordance with the second embodiment of this invention represents an unusually simple substrate for this test, since the test may be carried out by merely incubating the substrate with a small volume of the body fluid to be tested and then comparing the color developed with a standard.

It is understood that the foregoing detailed description is given merely by way of illustration and that may variations may be made therein without departing from the spirit of my invention.

Having described my invention, what I desire to secure by Letters Patent is:

1. A substrate for use in the measurement of the concentration in a body fluid of the enzyme glutamic-oxalacetic transaminase which comprises L-aspartic acid, α-ketoglutaric acid, a buffer adapted to maintain the pH in said body fluid during the measurement between about 6.5 and about 8 and a color forming azonium salt which couples with oxalacetic acid at a pH between about 6.5 and about 8 to form a colored coupling product.

2. A substrate for use in the measurement of the concentration in a body fluid of the enzyme glutamic-oxalacetic transaminase which comprises L-aspartic acid, α-ketoglutaric acid, a buffer adapted to maintain the pH in said body fluid during the measurement between about 7 and about 7.5 and a color forming azonium salt which couples with oxalacetic acid at a pH between about 7 and about 7.5 to form a colored coupling product.

3. A substrate according to claim 1 wherein said azonium salt is 6-benzamido-4-methoxy-m-toluidine diazonium chloride.

4. A tablet weighing about 20 to about 40 milligrams for use in the measurement of the concentration in a body fluid of the enzyme glutamic-oxalacetic transaminase which comprises an inert pharmaceutical diluent and a mixture of L-aspartic acid, α-ketoglutaric acid, a buffer adapted to maintain the pH in said body fluid during the measurement between about 6.5 and about 8 and a color forming azonium salt which couples with oxalacetic acid at a pH between about 6.5 and about 8 to form a colored coupling product.

5. A tablet according to claim 4 wherein said azonium salt is 6-benzamido-4-methoxy-m-toluidine diazonium chloride.

6. A method of determining the concentration in a body fluid of the enzyme glutamic-oxalacetic transaminase which comprises incubating a small volume of body fluid with a substrate comprising L-aspartic acid, α-ketoglutaric acid, a buffer adapted to maintain the pH in the mixture between about 6.5 and about 8 and a color forming azonium salt which couples with oxalacetic acid at a pH between about 6.5 and about 8 to form a colored coupling product.

7. A method according to claim 6 wherein said azonium salt is 6-benzamido-4-methoxy-m-toluidine diazonium chloride.

8. A method according to claim 6 wherein said body fluid is blood serum.

9. A method according to claim 6 wherein said mixture of body fluid and substrate is incubated at a temperature between about 25° C. and about 40° C.

10. A method of determining the concentration in blood serum of the enzyme glutamic-oxalacetic transaminase which comprises dissolving in a small volume of water a tablet comprising an inert pharmaceutical diluent and a mixture of L-aspartic acid, α-ketoglutaric acid, a buffer adapted to maintain the pH between 7 and 7.5, and 6-benzamido-4-methoxy-m-toluidine diazonium chloride, adding a small volume of blood serum to said solution and incubating the resulting mixture at a temperature between about 25° C. and about 40° C. to develop a visible color with a depth proportional to the amount of said enzyme in said serum.

11. A method according to claim 10 wherein the mixture of said solution and said blood serum is incubated at about 37° C. for about 15 to about 30 minutes.

12. A method of determining the concentration in a body fluid of the enzyme glutamic-oxalacetic transaminase which comprises incubating a small volume of body fluid with a substrate comprising L-aspartic acid, α-ketoglutaric acid and a buffer adapted to maintain the pH in the mixture between about 6.5 and about 8 whereby glutamic and oxalacetic acid are formed and adding a color forming azonium salt which couples with said oxalacetic acid to develop a visible color with a depth proportional to the amount of the oxalacetic acid produced by said enzyme in said body fluid.

13. A method according to claim 12 wherein said azonium salt is 4-amino-2,5-diethoxybenzanilide diazonium chloride.

14. A method according to claim 12 wherein said body fluid is blood serum.

15. A method according to claim 14 wherein said mixture of serum and substrate is incubated at a temperature between about 25° C. and about 40° C.

16. A method according to claim 14 wherein said mixture of serum and substrate is incubated at about 37° C. for about 15 to about 30 minutes.

17. A method according to claim 15 wherein the incubated mixture is cooled to a temperature between about 10° C. and about 20° C. before the addition of said azonium salt.

18. A method of determining the concentration in blood serum of the enzyme glutamic-oxalacetic transaminase which comprises dissolving in a small volume of water a first tablet comprising an inert pharmaceutical diluent and a mixture of L-aspartic acid, α-ketoglutaric acid and a buffer adapted to maintain the pH between 7 and 7.5, adding a small volume of serum to the solution, incubating the mixture of said serum and said first tablet at a temperature between about 25° C. and about 40° C. whereby glutamic and oxalacetic acid are formed, cooling the incubated mixture to a temperature between about 10° C. and about 20° C. and adding a second tablet comprising an inert pharmaceutical diluent and a mixture of a color forming azonium salt and an alkaline buffer to develop a visible color with a depth proportional to the amount of the oxalacetic acid produced by said enzyme in said serum.

19. A method according to claim 18 wherein said first and said second tablets each weigh between about 20 and about 40 milligrams.

20. A method of determining the concentration in blood serum of the enzyme glutamic-oxalacetic transaminase which comprises dissolving in a small volume of water a first tablet comprising an inert pharmaceutical diluent and a mixture of L-aspartic acid, α-ketoglutaric acid and a buffer adapted to maintain the pH between 7 and 7.5, adding a small volume of serum to the solution, incubating the mixture of said serum and said first tablet at a temperature between about 25° C. and about 40° C., cooling the incubated mixture to a temperature between about 10° C. and about 20° C. and adding a second tablet comprising an inert pharmaceutical diluent and a mixture of 4-amino-2,5-diethoxybenzanilide diazonium chloride and an alkaline buffer to develop a visible color with a depth proportional to the amount of said enzyme in said serum.

References Cited in the file of this patent

UNITED STATES PATENTS 2,359,052   Scharer _____ Sept. 26, 1944

OTHER REFERENCES

Sumner and Somers: "Chemistry and Methods of Enzymes," Academic Press Inc., N.Y., 1953, pages 346–347.

Kalnitsky and Taply: "A Sensitive Method for Estimation of Oxalacetate," Biochem. J., vol. 70, 1958, pages 28–34.